US012795029B2

(12) United States Patent
Fukunaga

(10) Patent No.: US 12,795,029 B2
(45) Date of Patent: Nov. 10, 2026

(54) IMAGE FORMING SYSTEM INCLUDING IMAGE READING DEVICE

(71) Applicant: KYOCERA Document Solutions Inc., Osaka (JP)

(72) Inventor: Yasuyuki Fukunaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 246 days.

(21) Appl. No.: 18/645,310

(22) Filed: Apr. 24, 2024

(65) Prior Publication Data

US 2024/0364828 A1 Oct. 31, 2024

(30) Foreign Application Priority Data

Apr. 28, 2023 (JP) ................................. 2023-074747

(51) Int. Cl.

| | |
|---|---|
| ***H04N 1/047*** | (2006.01) |
| ***H04N 1/00*** | (2006.01) |
| ***H04N 1/028*** | (2006.01) |
| *B41J 2/21* | (2006.01) |
| *H04N 1/10* | (2006.01) |

(52) U.S. Cl.

CPC ....... *H04N 1/0473* (2013.01); *H04N 1/00801* (2013.01); *H04N 1/00819* (2013.01); *H04N 1/028* (2013.01); *B41J 2/2135* (2013.01); *B41J 2/2142* (2013.01); *H04N 1/1061* (2013.01); *H04N 2201/0081* (2013.01)

(58) Field of Classification Search

None

See application file for complete search history.

(56) References Cited

U.S. PATENT DOCUMENTS

2007/0058219 A1* 3/2007 Yamaguchi .......... H04N 1/0473 358/497
2024/0300760 A1* 9/2024 Iida .......................... B65H 7/06

FOREIGN PATENT DOCUMENTS

JP 2011176669 A 9/2011

* cited by examiner

*Primary Examiner* — Dov Popovici
(74) *Attorney, Agent, or Firm* — Studebaker Brackett PLLC

(57) ABSTRACT

An image forming system includes an image reading device which reads an image of a sheet conveyed along a conveyance path. The image reading device includes a reading sensor and a moving mechanism. The reading sensor optically reads the image. The moving mechanism moves the reading sensor to a reading position closer to the conveyance path and readable the image and a non-reading position separated from the conveyance path farther than the reading position.

7 Claims, 12 Drawing Sheets

IMAGE FORMING SYSTEM INCLUDING IMAGE READING DEVICE

INCORPORATION BY REFERENCE

This application is based on and claims the benefit of priority from Japanese patent application No. 2023-074747 filed on Apr. 28, 2023, which is incorporated by reference in its entirety.

BACKGROUND

The present disclosure relates to an image forming system including an image reading device.

In an image forming system including an inkjet type image forming apparatus, an image quality is influenced by a state of a recording head and ink. For example, when the nozzle surface of the recording head is dried, the ink becomes viscous and causes ejection failure, or the ink arrives at a position deviated from a desired position and white streaks are generated in the image.

To prevent such image defects and maintain an image quality, the image forming system includes an image reading device which reads and inspects an image on a sheet, such as a test chart. Based on the image read by the image reading device, the defective nozzle of the recording head is specified, and the image is corrected. Such an image inspection is performed, for example, once in thousands of the sheets.

The image reading device is provided with a reading sensor such as a CIS (Contact Image Sensor) for reading an image. The CIS is disposed such that the image reading surface faces the sheet to be conveyed along the conveyance path. The image reading surface is usually covered with a transparent glass plate. When a large amount of the sheets are printed or when it is used for a long period of time, paper powder or fine dust may adhere to the glass plate. Then, streaks are generated in the read image, and the image inspection cannot be performed accurately.

Therefore, the image reading apparatus may be provided with a cleaning member for cleaning the glass plate. The cleaning member is rotatably provided to clean the glass plate by rotating within a predetermined angle.

However, in the image reading apparatus described above, since the glass plate is cleaned by rotating the cleaning member, contact and non-contact between the cleaning member and the glass plate are repeated. Therefore, vibration is generated in the CIS, and a configuration to absorb the vibration is required. Further, only a narrow range near the center of rotation of the cleaning member can be cleaned. Therefore, foreign matter adhering to the glass surface where cannot be cleaned may fall on the sheet. Further, since the amount of engagement of the cleaning member to the glass surface and the linear speed of the cleaning member are varied, the cleaning effect is uneven.

SUMMARY

An image forming system according to the present disclosure includes an image reading device which reads an image of a sheet conveyed along a conveyance path. The image reading device includes a reading sensor and a moving mechanism. The reading sensor optically reads the image. The moving mechanism moves the reading sensor to a reading position closer to the conveyance path and readable the image and a non-reading position separated from the conveyance path farther than the reading position.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the drawings, an image forming system according to one embodiment of the present disclosure will be described.

Figure 1:
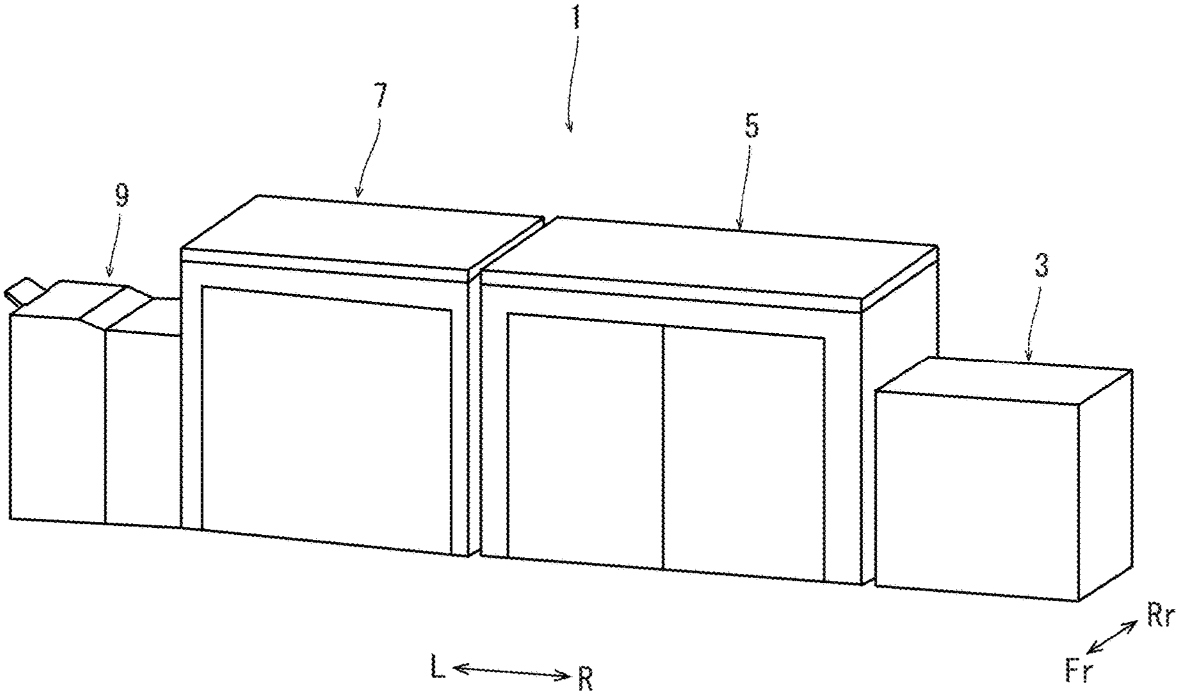
FIG. 1 is a perspective view schematically showing an image forming system according to one embodiment of the present disclosure.

First, with reference to FIG. 1, the image forming system will be described. FIG. 1 is a perspective view showing the image forming system. L, R, Fr, and Rr, which are attached to each figure as appropriate, indicate the left, right, front, and rear sides of the image forming system, respectively.

The image forming system 1 includes a sheet feeding device 3, an image forming device 5, a drying device 7, and a post-processing device 9. The sheet feeding device 3 stores a sheet and feeds the sheet to the image forming device 5. The image forming device 5 is disposed on the left side of the sheet feeding device 3, and forms an image on the sheet fed from the sheet feeding device 3 by an inkjet method, for example, based on image data inputted from an external computer. The drying device 7 is disposed on the left side of the image forming device 5, and dries the sheet on which the image is formed while conveying the sheet. The post-processing device 9 is disposed on the left side of the drying device 7 and performs post-processing on the sheet dried by the drying device 7.

Figure 2:
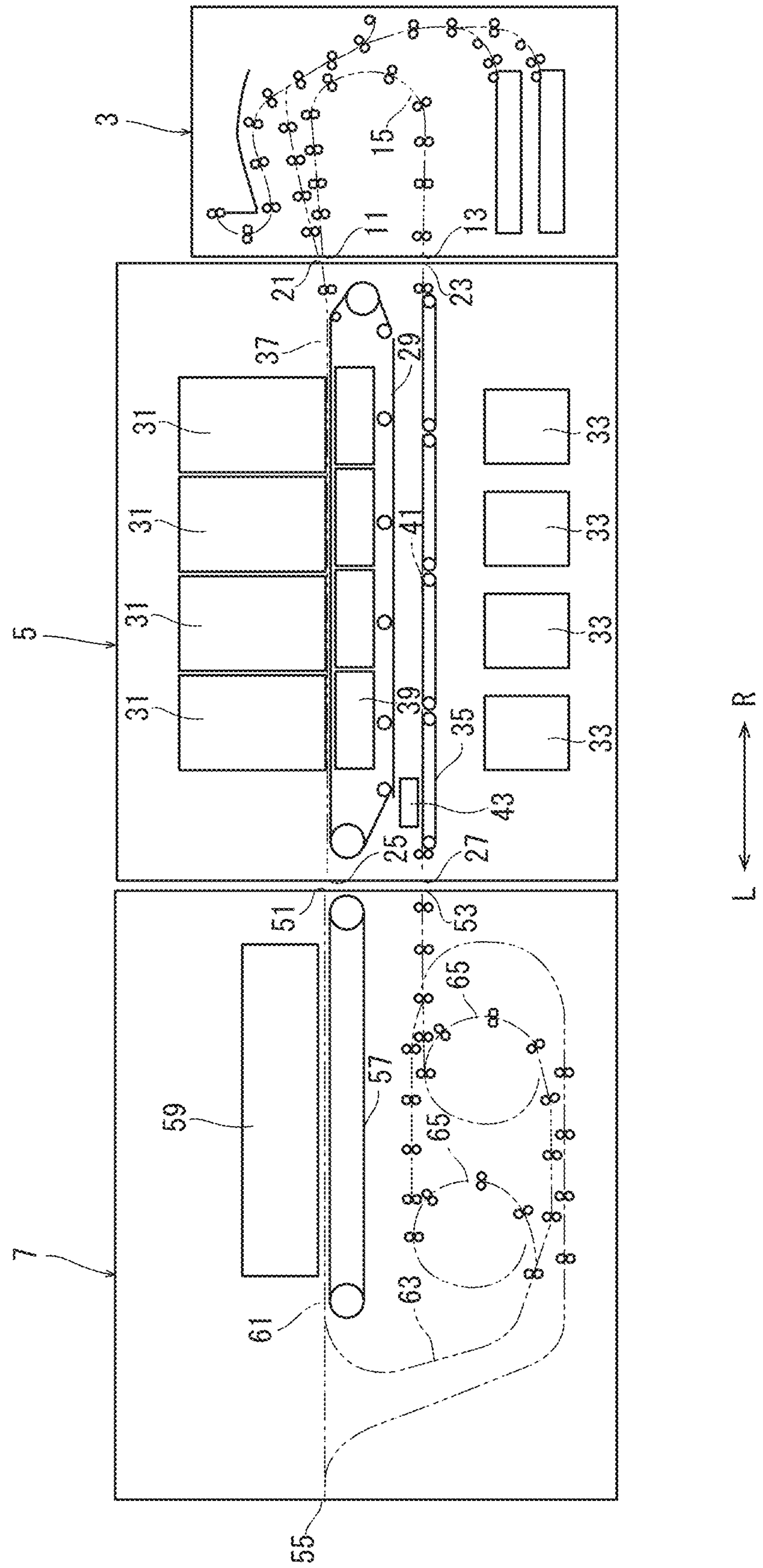
FIG. 2 is a front view showing an inner structure of a sheet feeding device, an image forming devices and a drying device of the image forming system according to the embodiment of the present disclosure.

Next, the sheet feeding device 3, the image forming device 5, and the drying device 7 will be described with reference to FIG. 2. FIG. 2 is a front view schematically showing an inner structure of the image forming system 1.

First, the sheet feeding device 3 will be described. A sheet discharge port 11 and a sheet reception port 13 are formed on the left side surface of the sheet feeding device 3. The discharge port 11 is disposed on the upper portion of the left side surface. The sheet fed from the sheet feeding cassette or the manual feed tray is discharged toward the image forming device 5 through the discharge port 11. The reception port 13 is disposed on the lower portion of the left side surface. The sheet discharged from the image forming device 5 is received to the sheet feeding device 3 through the reception port 13. The sheet received through the reception port 13 is conveyed along a conveyance path 15 toward the discharge port 11.

Next, the image forming device 5 will be described. A right reception port 21 and a right discharge port 23 are formed on the right side surface of the image forming device 5. The right reception port 21 is disposed so as to face the discharge port 11 of the sheet feeding device 3. The sheet discharged from the discharge port 11 of the sheet feeding device 3 is received by the image forming device 5 through the right reception port 21. The right discharge port 23 is disposed so as to face the reception port 13 of the sheet feeding device 3. The sheet discharged through the right discharge port 23 is received by the sheet feeding device 3 through the reception port 13. Further, a left discharge port 25 and a left reception port 27 are formed on the left side surface of the image forming device 5. The left discharge port 25 is disposed on the upper portion of the left side surface, and the left reception port 27 is disposed on the lower portion of the left side surface.

The image forming device 5 includes one main conveying belt 29, four head units 31, four ink containers 33, and four both-side printing conveying belts 35. The main conveying belt 29 is an endless belt formed with a large number of fine through-holes penetrating in the thickness direction. The main conveying belt 29 is wound around a driving roller and a driven roller spaced apart in the left-and-right direction, and a plurality of tension rollers. The main conveying belt 29 travels in the counterclockwise direction of FIG. 2 by rotation of the driving roller. The main conveying belt 29 traveling along the upper traveling track forms a main conveyance path 37 along which the sheet received through the right reception port 21 is conveyed in the conveying direction toward the left discharge port 25. A plurality of suction devices 39 are arranged in the hollow space of the main conveying belt 29. The suction device 39 generates a negative pressure in the through-holes of the main conveying belt 29 conveyed along the upper traveling track, and attracts the sheet to the main conveying belt 29.

The four head units 31 correspond to four colors including black, cyan, magenta, and yellow of ink, and are arranged above the traveling track of the main conveying belt 29 along the conveying direction. Each head unit 31 has a plurality (three in one example) of recording heads (not shown). Each recording head is provided with a large number of ink ejection nozzles. Each ink ejection nozzle ejects the ink downward. The four ink containers 33 contains the black, cyan, magenta, and yellow ink, and are connected to the corresponding head units 31.

Each of the four both-side printing conveying belts 35 is an endless belt wound with a driving roller and a driven roller spaced apart in the left-and-right direction. The four both-side printing conveying belts 35 are arranged side by side below the main conveying belt 29 between the left reception port 27 and the right discharge port 23. Each both-side printing conveying belt 35 travels in the clockwise direction of FIG. 2. The both-side printing conveying belt 35 traveling along the upper traveling track forms a both-side conveyance path 41 along which the sheet is conveyed along the conveying direction from the left reception port 27 to the right discharge port 23. An image reading inspection device 43 is provided inside the left reception port 27 and above the both-side printing conveyance path 41. The image reading inspection device 43 is an example of an image reading apparatus of the present disclosure. The image reading inspection device 43 will be described later.

Next, the drying device 7 will be described. A right reception port 51 and a right discharge port 53 are formed on the right side surface of the drying device 7. The right reception port 51 is disposed so as to face the left discharge port 25 of the image forming device 5. The sheet discharged through the left discharge port 25 of the image forming device 5 is received by the drying device 7 through the right reception port 51. The right discharge port 53 is disposed so as to face the left reception port 27 of the image forming device 5. The sheet discharged through the right discharge port 53 is received by the image forming device 5 through the left reception port 27. Further, a left discharge port 55 is formed on the upper portion of the left side surface of the drying device 7.

The drying device 7 includes a conveying belt 57 and a dryer 59. The conveying belt 57 is an endless belt wound around a driving roller and a driven roller spaced apart in the left-and-right direction. The conveying belt 57 travels in the counterclockwise direction of FIG. 2 by rotation of the driving roller. The conveying belt 57 traveling along the upper traveling track forms a main conveyance path 61 along which the sheet received through the right reception port 51 is conveyed along the conveying direction toward the left discharge port 55. The dryer 59 is disposed above the upper traveling track of the conveying belt 57.

Further, the drying device 7 includes an inversion path 63. The inversion path 63 branches from the main conveyance path 61 on the downstream side of the conveying belt 57 and is connected to the right discharge port 53 through two inversion parts 65.

Next, the image forming operation of the image forming system 1 will be briefly described. The sheet discharged through the discharge port 11 of the sheet feeding device 3 is received by the image forming device 5 through the right reception port 21 of the image forming device 5, and conveyed along the main conveyance path 37. The sheet is conveyed while being attracted to the main conveying belt 29. At this time, the inks of four colors are ejected from the four head units 31 in accordance with the image data, and an image is formed on the sheet. The sheet on which the image is formed is discharged through the left discharge port 25, received through the right reception port 51 of the drying device 7 to the drying device 7, and conveyed along the main conveyance path 61. At this time, the image formed on the sheet is dried by the dryer 59.

In the case of one-side printing, the sheet is discharged from the left discharge port 55 to the post-processing device 9. In the post-processing device 9, a predetermined post-processing is applied to the sheet. In the case of both-side printing, the sheet is conveyed from the main conveyance path 61 through the inversion path 63, and then conveyed to the two inversion parts 65 alternately. After the sheet is inverted upside down by the inversion part 65, it is received by the image forming device 5 through the left reception port 27 of the image forming device 5 from the right discharge port 53. The sheet is conveyed along the both-side printing conveyance paths 41 of the image forming device 5, and is received through the right discharge port 23 to the sheet feeding device 3 from the reception port 13 of the sheet feeding device 3. The sheet is conveyed along the conveyance path 15 from the reception port 13 toward the discharge port 11, and is received from the discharge port 11 by the image forming device 5 through the right reception port 21 of the image forming device 5. Thereafter, as described above, an image is formed on the back surface of the sheet.

During the image forming operation, when the nozzle surface of the recording head of each head unit 31 of the image forming device 5 dries, the viscosity of the ink may increase, causing ejection failure. Alternatively, the ink may arrive at a position deviated from a desired position. Therefore, as described above, the image inspection is performed using the image reading inspection device 43 at a frequency of about once in thousands of the sheets.

Figure 3:
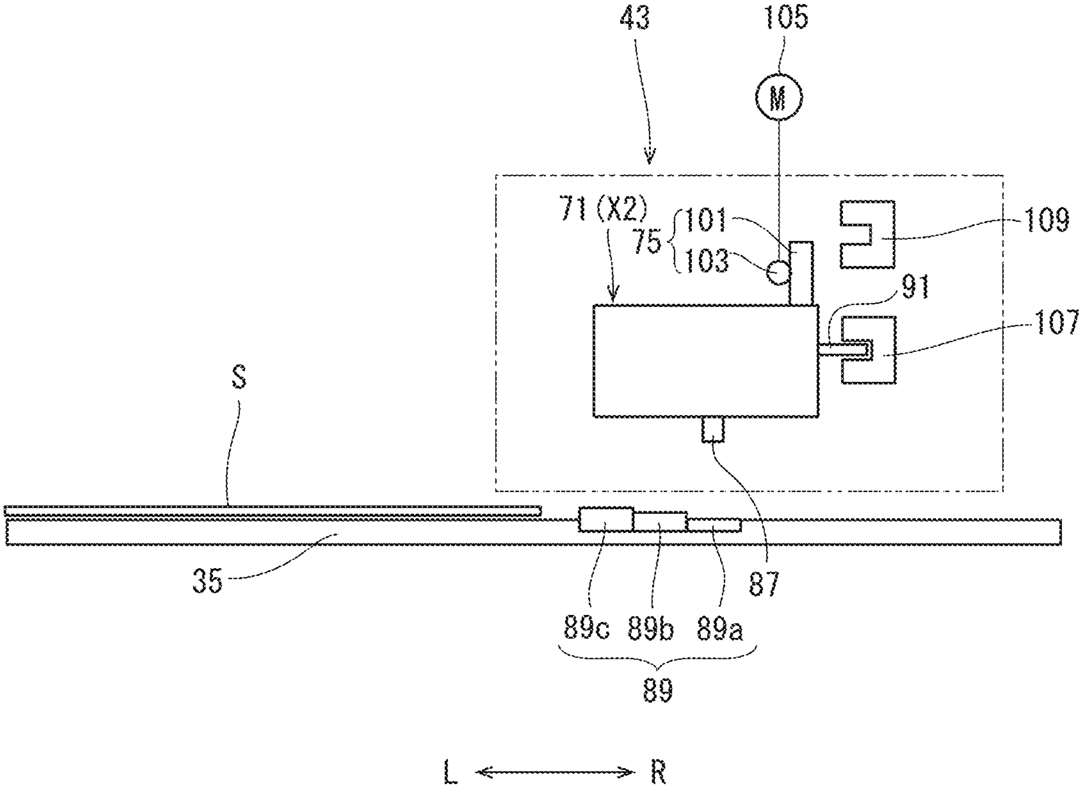
FIG. 3 is a front view schematically showing an inner structure of an image reading inspection device according to a first embodiment, in the image forming system according to the embodiment of the present disclosure.

Next, the image reading inspection device 43 according to the first embodiment will be described with reference to FIG. 3 to FIG. 4B. FIG. 3 is a view schematically showing the image reading inspection device 43, FIG. 4A is a front view schematically showing a CIS unit 71, and FIG. 4B is a plan view schematically showing the CIS unit 71.

As shown in FIG. 3, the image reading inspection device 43 includes a CIS unit 71 and a lifting device 75 which moves the CIS unit 71 in a direction (the upper-and-lower direction) away from the both-side printing conveyance path 41 (the both-side printing conveying belt 35).

First, the CIS unit 71 will be described. As shown in FIG. 4A and FIG. 4B, the CIS unit 71 includes two contact image sensors (CISs) 81 that can correspond to the A4 size and a housing 83 that houses the two CISs 81. As shown in FIG. 4B, the two CISs 81 are shifted from each other in a width direction (the front-and-rear direction) orthogonal to the conveying direction in a posture in which the reading surfaces face downward and their longitudinal direction is along the width direction. With this arrangement, the readable width D1 by the reading surface becomes 350±0.5 mm, and the sheet S (a test chart, and the like) having the maximum width D2 (330.2 mm, 13 in) can be read. The CIS 81 is an example of the reading sensor in the present disclosure.

Figure 4A:
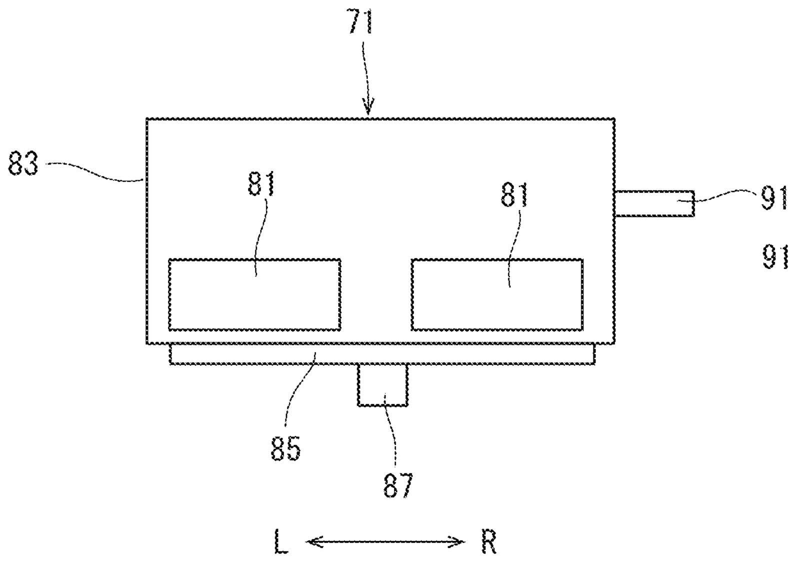
FIG. 4A is a front view schematically showing a CIS unit of the image reading inspection device according to the first embodiment, in the image forming system according to the embodiment of the present disclosure.
Figure 4B:
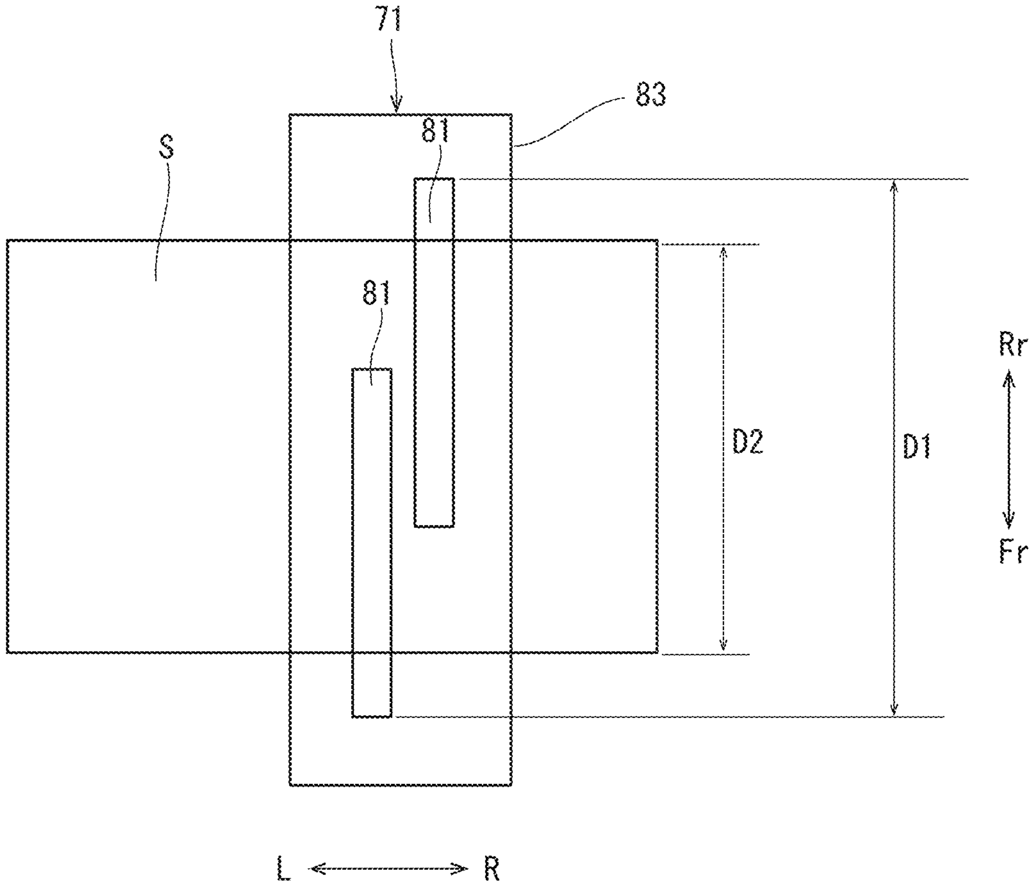
FIG. 4B is a plan view schematically showing the CIS unit of the image reading inspection device according to the first embodiment, in the image forming system according to the embodiment of the present disclosure.

As shown in FIG. 4A, the lower surface of the housing 83 (the surface facing the both-side printing conveying belt 35 (the both-side printing conveyance path 41)) is made of a transparent glass plate 85. That is, the reading surface of the CIS 81 is covered with the glass plate 85. The glass plate 85 is an example of the transparent member covering the reading surface in the present disclosure. On the lower surface of the housing 83, positioning pins 87 are provided on both outer sides of the sheet passing region of the sheet S having the maximum width D2 in the width direction. The positioning pins 87 adjust the CIS 81 to an appropriate height corresponding to the thickness of the sheet on the both-side printing conveyance path 41 during the image reading. That is, as shown in FIG. 3, an adjustment part 89 corresponding to the positioning pin 87 is provided at a predetermined position of the both-side printing conveying belt 35. The adjustment part 89 includes a plurality of (in this example, three) protrusions 89*a*, 89*b*, and 89*c* arranged sequentially along the conveying direction. The three protrusions 89*a*, 89*b*, and 89*c* are formed at different heights from the upper surface of the both-side printing conveying belt 35. The upper surface of the lowest protrusion 89*a* is formed at the same height as the upper surface of the both-side printing conveying belt 35. The lowest protrusion 89*a* is used as the reference protrusion. By abutting the positioning pin 87 of the housing 83 on one of the protrusions, the distance between the two CISs 81 housed in the housing 83 and the both-side printing conveying belt 35 can be adjusted according to the thickness of the sheet. Thus, the focal length of the lens array of the CIS 81 can be appropriately adjusted according to the thickness of the sheet.

Further, a light shielding plate 91 protruding in the horizontal direction is provided on one side surface of the housing 83 (the right side surface in this example).

As shown in FIG. 3, the lifting device 75 is a rack and pinion including a rack 101 provided in the housing 83 along the upper-and-lower direction, and a pinion 103 supported by the main body of the image forming device 5 and engaged with the rack 101. The pinion 103 is connected to a motor 105, and is driven by the motor 105 to be rotated. By rotating the pinion 103, the CIS unit 71 moves in the upper-and-lower direction together with the rack 101. The motor 105 is electrically connected to a control part 201 (see FIG. 5).

The CIS unit 71 can be moved to a reading position X1, a standby position X2, and a retracted position X3 by the lifting device 75. The reading position X1 is a position where the positioning pin 87 provided in the housing 83 abut against any of the protrusions 89*a*, 89*b*, and 89*c* of the adjustment part 89. At the reading position X1, the sheet conveyed on the both-side printing conveying belt 35 can be properly read by the two CISs 81. The standby position X2 is a position separated upward from the both-side printing conveying belt 35 farther than the reading position X1 (see FIG. 3). The standby position X2 is the home position (HP) of the CIS unit 71. The retracted position X3 is a position separated upward from the both-side printing conveying belt 35 farther than the standby position X2. As described above, the standby position X2 and the retracted position X3 are examples of a non-reading position of the reading sensor in the present disclosure. The lifting device 75 is an example of the moving mechanism which moves the reading sensor (CIS 81) to the reading position X1 and the non-reading position (the standby position X2, the retracted position X3) in the present disclosure.

At the standby position X2 and the retracted position X3, an HP sensor 107 and an upper limit sensor 109 are provided, respectively. Each sensor is a PI sensor which is switched from an OFF state to an ON state by blocking an optical path by a light shielding plate 91 of a housing 83, and switched from the ON state to the OFF state by separating the light shielding plate 91 from the optical path. Each sensor is electrically connected to the control part 201 (see FIG. 5), and outputs an off signal indicating the OFF state and an on signal indicating the ON state to the control part 201.

Figure 5:
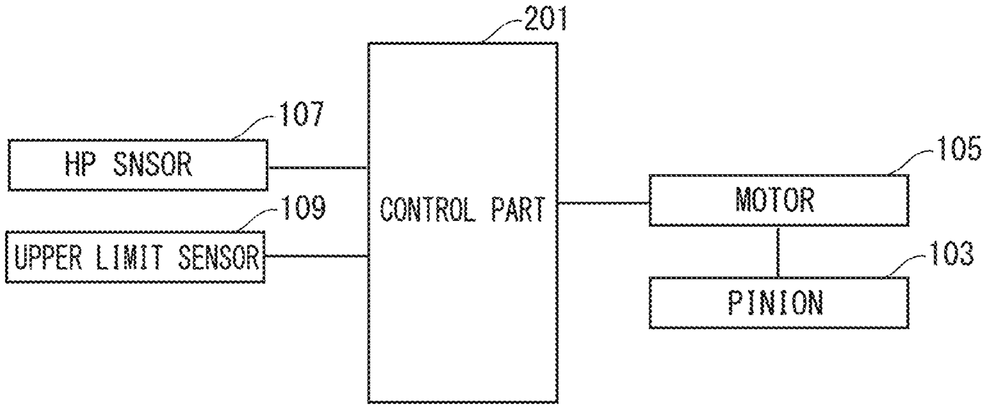
FIG. 5 is a block diagram showing a control part of the image reading inspection device according to the first embodiment, in the image forming system according to the embodiment of the present disclosure.

Next, the control part 201 will be described with reference to FIG. 5. FIG. 5 is a block diagram showing the control part 201. As described above, the control part 201 receives the ON signal indicating the on state or the OFF signal indicating the OFF state from the HP sensor 107 and the upper limit sensor 109 of the CIS unit 71. Further, the control part 201 controls the operation of the motor 105 of the lifting device 75 to rotate the pinion 103 to move the CIS unit 71 in the upper-and-lower direction. In addition, the control part 201 controls the driving of a motor (not shown) for rotating the driving rollers of the main conveying belt 29 and the both-side printing conveying belt 35, and performs the aforementioned image forming operation, shading correction of the CIS 81, image inspection operation, and the like. These explanations are omitted.

Figure 6A:
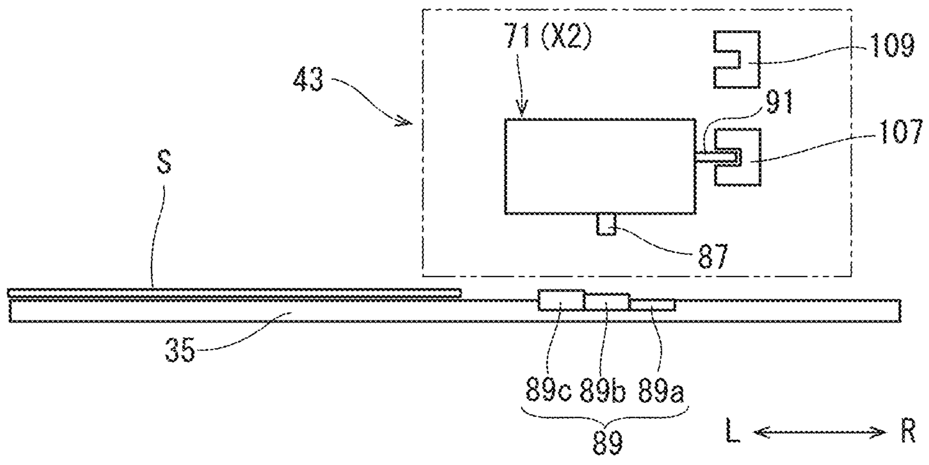
FIG. 6A is a view explaining an image reading operation of the image reading inspection device according to the first embodiment, in the image forming system according to the embodiment of the present disclosure.
Figure 6B:
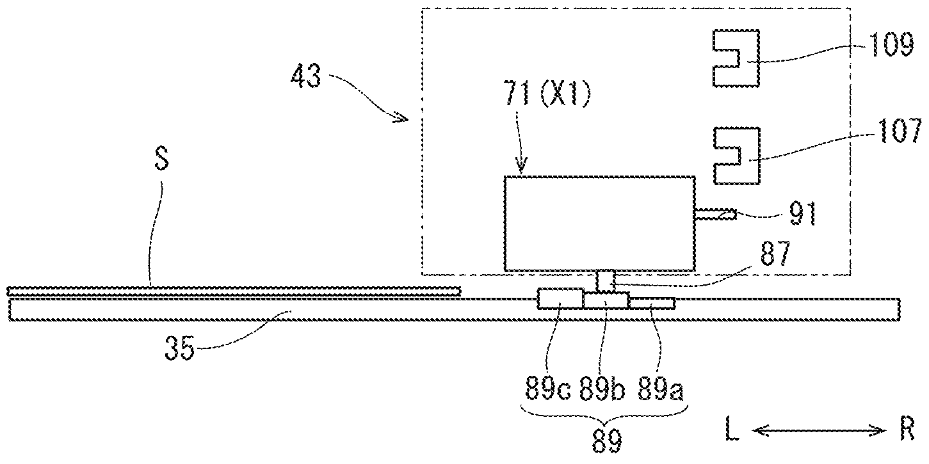
FIG. 6B is a view explaining the image reading operation of the image reading inspection device according to the first embodiment, in the image forming system according to the embodiment of the present disclosure.
Figure 6C:
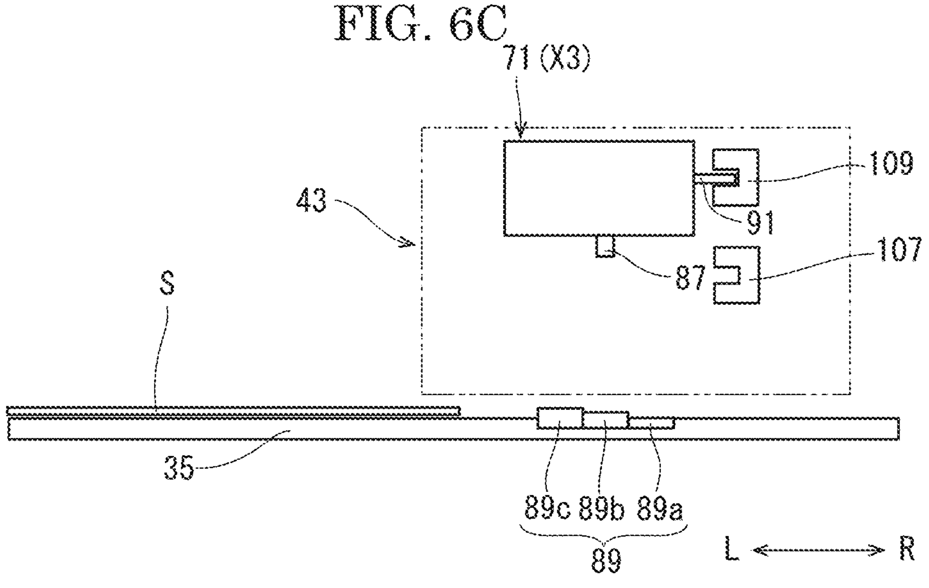
FIG. 6C is a view explaining the image reading operation of the image reading inspection device according to the first embodiment, in the image forming system according to the embodiment of the present disclosure.

The image reading operation of the image reading inspection device 43 according to the t first embodiment of the image forming system 1 having the above configuration will be described with reference to FIG. 3 and FIG. 6A to FIG. 6C. FIG. 6A to FIG. 6C are front views schematically showing the image reading inspection device 43. In the initial state, as shown in FIG. 3, the CIS unit 71 is moved to the home position (the standby position X2).

First, the control part 201 travels the both-side printing conveying belt 35 to a position where any of the protrusions 89*a*, 89*b*, and 89*c* of the adjustment part 89 according to the thickness of the sheet input in advance faces the positioning pins 87 of the CIS unit 71 from below. In this example, as shown in FIG. 6A, the both-side printing conveying belt 35 is positioned from the home position so that the second protrusion 89*b* is positioned below the positioning pins 87.

Next, the control part 201 drives the motor 105 to rotate the pinion 103 to lower the CIS unit 71 from the standby position X2. When the CIS unit 71 is lowered and the light shielding plate 91 of the CIS unit 71 is separated from the optical path of the HP sensor 107, the HP sensor 107 outputs the OFF signal to the control part 201. The control part 201 stops the driving of the motor 105 after a predetermined time elapses after the OFF signal is input. Thus, as shown in FIG. 6B, the CIS unit 71 is lowered to the reading position X1 where the positioning pin 87 abuts the protrusion 89*b*.

In this state, when the sheet S is conveyed under the image reading inspection device 43, the image of the sheet S is read by the two CISs 81. The control part 201 executes image inspection based on the read image. Details of the image inspection are omitted.

When the image inspection is finished, the control part 201 drives the motor 105 to rotate the pinion 103 to lift the CIS unit 71 from the reading position X1. When the CIS unit 71 is lifted and the light path of the upper limit sensor 109 is blocked by the light shielding plate 91 of the CIS unit 71, the upper limit sensor 109 outputs the ON signal to the control part 201. The control part 201 stops the driving of the motor 105 after a predetermined time elapses after the ON signal is input. Thus, as shown in FIG. 6C, the CIS unit 71 is moved to the retracted position X3.

When the power is turned off, when the one-side printing is performed, and when it is in standby, the image reading inspection device 43 is maintained in this state. That is, the CIS unit 71 is moved to the retracted position X3, and the glass plate 85 (see FIG. 4A) of the CIS unit 71 is spaced upward from the both-side printing conveying belt 35.

As described above, according to the present disclosure, the CIS unit 71 is moved from the reading position X1 to the retracted position X3 when the power is turned off, when the one-side printing is performed, and when it is in standby. In other words, the glass plate 85 of the CIS unit 71 is separated from the both-side printing conveying belt 35 when the power is turned off, the one-side printing, and when it is standby more upward than when the image reading is performed, so that the distance between the glass plate 85 and the both-side printing conveying belt 35 becomes longer. Therefore, paper powder and foreign matter generated from the sheet conveyed by the both-side printing conveying belt 35 hardly adhere to the glass plate 85.

Figure 7:
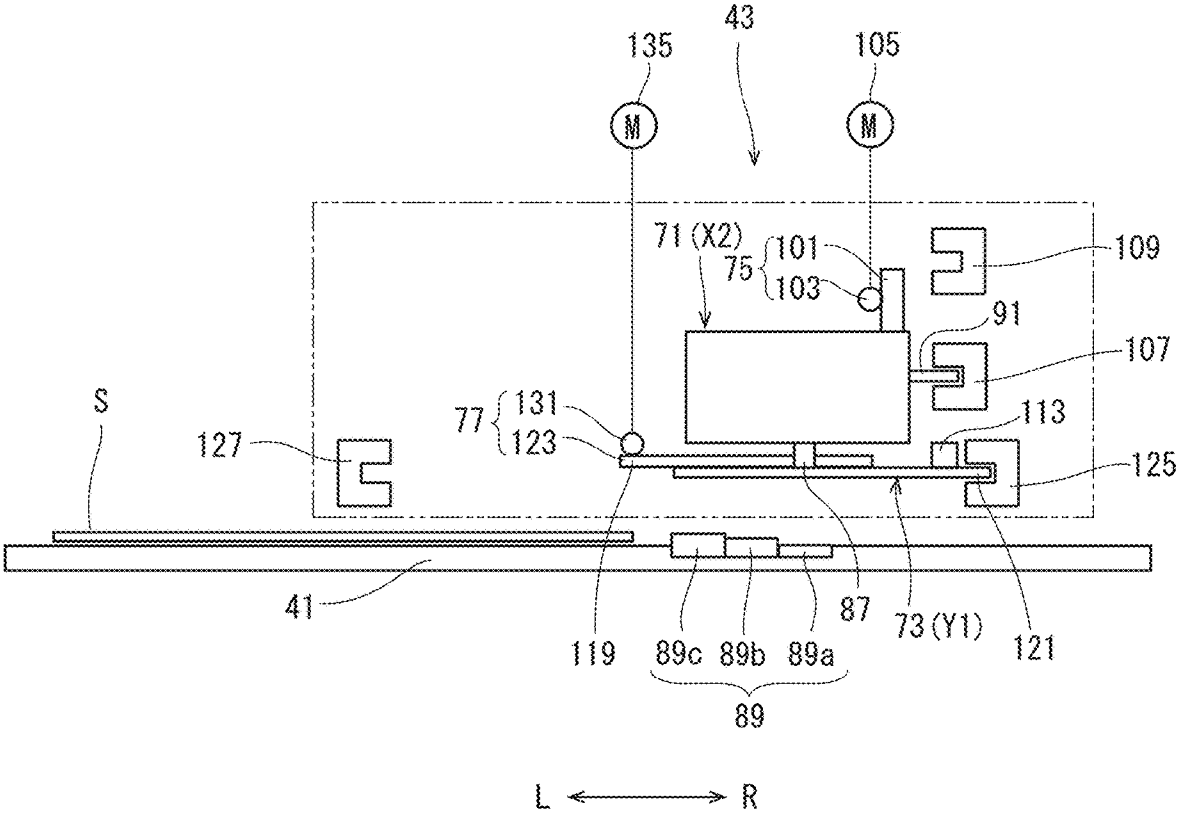
FIG. 7 is a front view schematically showing the inner structure of the image reading inspection device according to a second embodiment, in the image forming system according to the embodiment of the present disclosure.
Figure 8:
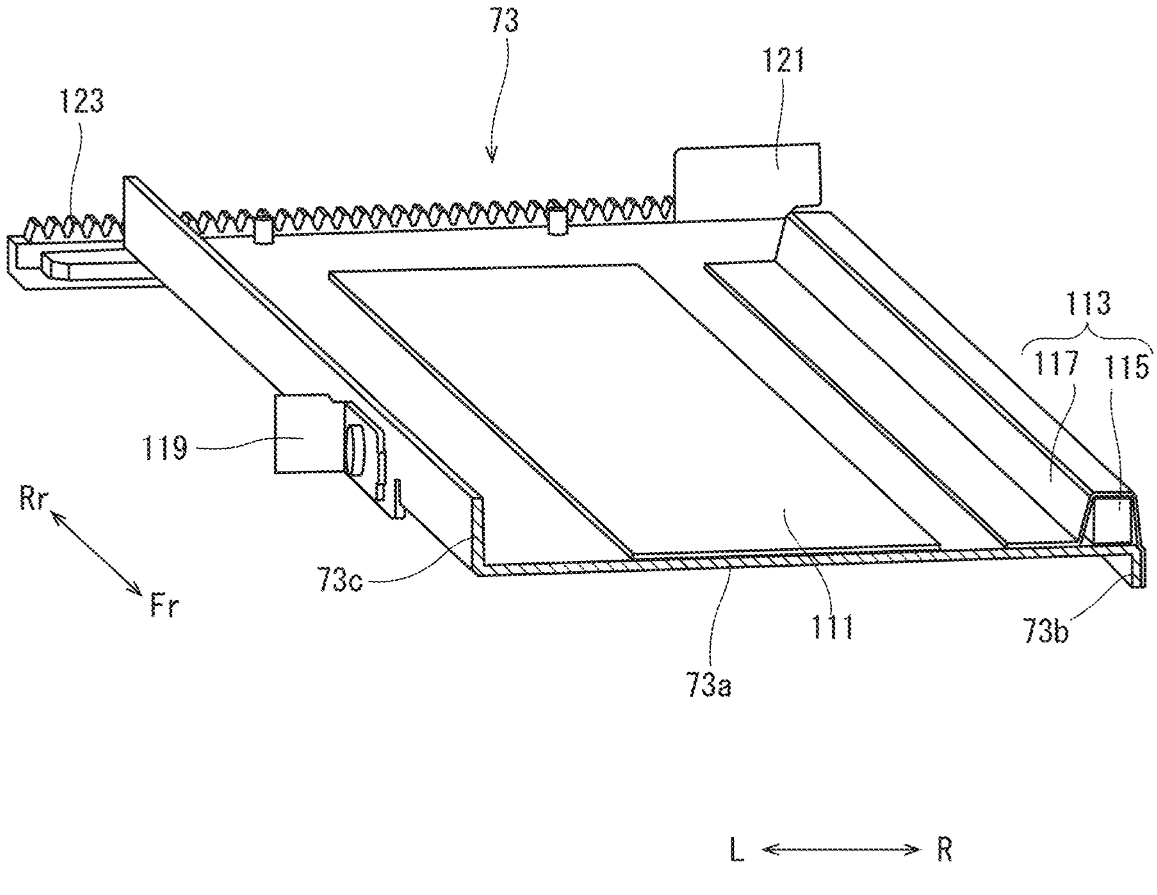
FIG. 8 is a perspective view showing a cover plate of the image reading inspection device according to the second embodiment, in the image forming system according to the embodiment of the present disclosure.

Next, the image reading inspection device 43 according to the second embodiment will be described with reference to FIG. 7 and FIG. 8. FIG. 7 is a schematic view showing the image reading inspection device 43, and FIG. 8 is a cross-sectional perspective view showing the cover plate 73.

As shown in FIG. 7, the image reading inspection device 43 includes the CIS unit 71, a cover plate 73, the lifting device 75 which moves the CIS unit 71 in a direction (the upper-and-lower direction) away from the both-side printing conveyance path 41, and a moving device 77 which moves the cover plate 73 in a direction (the left-and-right direction) parallel to the conveying direction. Since the CIS unit 71 and the lifting device 75 are the same as those in the first embodiment, description thereof will be omitted.

Next, the cover plate 73 will be described with reference to FIG. 8. The cover plate 73 has a rectangular flat plate portion 73*a* having a dimension larger than the readable range of the two CISs 81, a right bent portion 73*b* bent downward from the right edge (the end edge on the downstream side in the conveying direction) of the flat plate portion 73*a*, and a left bent portion 73*c* bent upward from the left edge (the end edge on the upstream side in the conveying direction) of the flat plate portion 73*a*. The cover plate 73 is made of sheet metal, for example. A shading sheet 111 is adhered on the upper surface of the flat plate portion 73*a*. The shading sheet 111 has a dimension larger than the readable range of the two CIS 81, and is made of white resin film. The shading sheet 111 is an example of the adjustment reference white plate in the present disclosure.

Further, on the upper surface of the flat plate portion 73*a*, a cleaning member 113 is provided along the right end portion. The length (along the front-and-rear direction) of the cleaning member 113 is larger than the length (along the front-and-rear direction) of the glass plate 85 of the CIS unit 71. The cleaning member 113 includes a rectangular parallelepiped urethane foam 115 and a wiping cloth 117 supported by the cover plate 73 so as to cover the left, upper and right surfaces of the urethane foam 115. The left end portion of the wiping cloth 117 is affixed to the flat plate portion 73*a*, and the right end portion is affixed to the outer surface of the right bent portion 73*b*.

A left light shielding plate 119 is attached on the outer surface of the left bent portion 73*c*. Further, the flat plate portion 73*a* is provided with a right light shielding plate 121 bent upward from the right end of the rear edge. Further, a rack 123 along the left-and-right direction is attached to the flat plate portion 73*a* along the rear edge. The rack 123 constitutes the moving device 77 as described later.

As shown in FIG. 7, the moving device 77 is a rack and pinion comprising the rack 123 provided on the cover plate 73, and a pinion 131 supported by the main body of the image forming device 5 and engaged with the rack 123. The pinion 131 is connected to a motor 135, and is driven by the motor 135 to be rotated. By rotating the pinion 131, the cover plate 73 is moved in the-right and-left direction together with the rack 123. The motor 135 is electrically connected to the control part 201 (see FIG. 9).

The cover plate 73 can be moved to a cover position Y1 and a retracted position Y2 by the moving device 77. The cover position Y1 is a position where the shading sheet 111 faces the glass plate 85 of the housing 83 of the CIS unit 71, that is the reading surface of the CIS 81 from below. At this time, the cleaning member 113 is separated rightward from the space below the glass plate 85. The cover position Y1 is the home position of the cover plate 73. The retracted position Y2 is a position completely separated leftward from the space below the CIS unit 71. As described above, the cover plate 73 is an example of the cover member movable between the cover position and the retracted position.

At the cover position Y1 and the retracted position Y2, an HP sensor 125 and a retraction sensor 127 are provided, respectively. The HP sensor 125 is a PI sensor which is switched from an OFF state to an ON state when the light path is blocked by the right light shielding plate 121, and switched from the ON state to the OFF state when the right light shielding plate 121 is separated from the light path. The retraction sensor 127 is a PI sensor which is switched from an OFF state to an ON state when the light path is blocked by the left light shielding plate 119, and switched from the ON state to the OFF state when the left light shielding plate 119 is separated from the light path. Each sensor is electrically connected to the control part 201 (see FIG. 9), and outputs an off signal indicating the OFF state and an on signal indicating the ON state to the control part 201.

Figure 9:
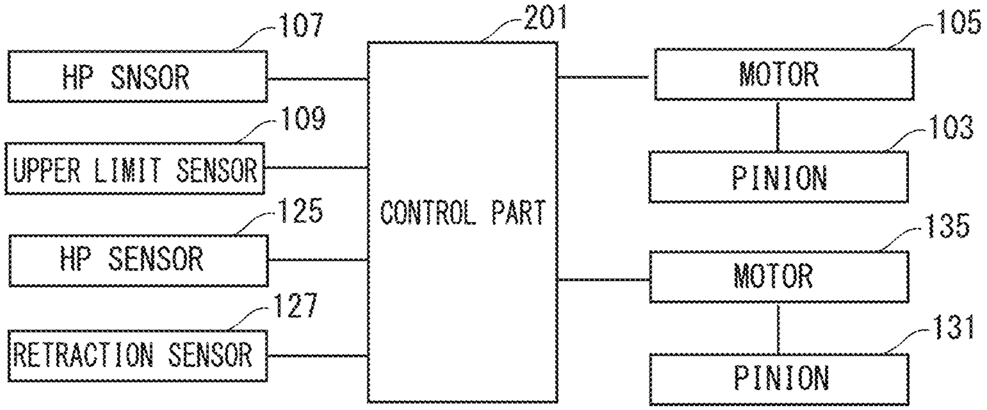
FIG. 9 is a block diagram showing a control part of the image reading inspection device according to the second embodiment, in the image forming system according to the embodiment of the present disclosure.

Next, the control part 201 will be described with reference to FIG. 9. FIG. 9 is a block diagram showing the control part 201. As described above, the control part 201 receives the ON signal indicating the ON state and the OFF signal indicating the OFF state from the HP sensor 107 and the upper limit sensor 109 of the CIS unit 71. The control part 201 controls the motor 105 of the lifting device 75 to rotate the pinion 103 and to move the CIS unit 71 in the upper-and-lower direction. Further, the ON signal indicating the OFF state or the OFF signal indicating the OFF state is input to the control part 201 from the HP sensor 125 and the retraction sensor 127 of the cover plate 73. Further, the control part 201 controls the motor 135 of the moving device 77 to rotate the pinion 131 and to move the cover plate 73 in the left-and-right direction.

Figure 10A:
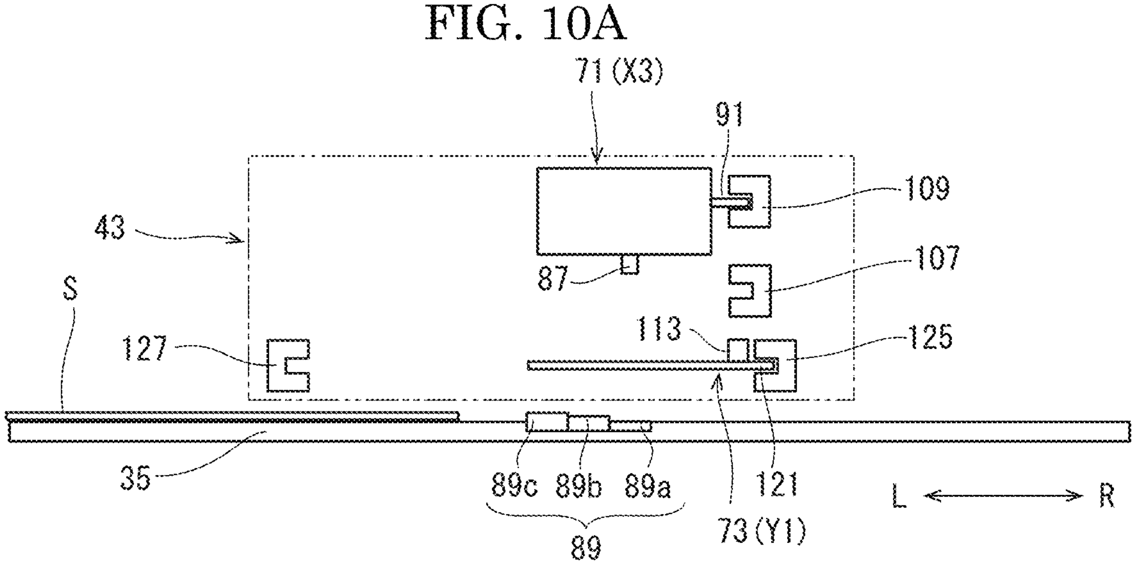
FIG. 10A is a view explaining an image inspection operation of the image reading inspection device according to the second embodiment, in the image forming system according to the embodiment of the present disclosure.
Figure 10B:
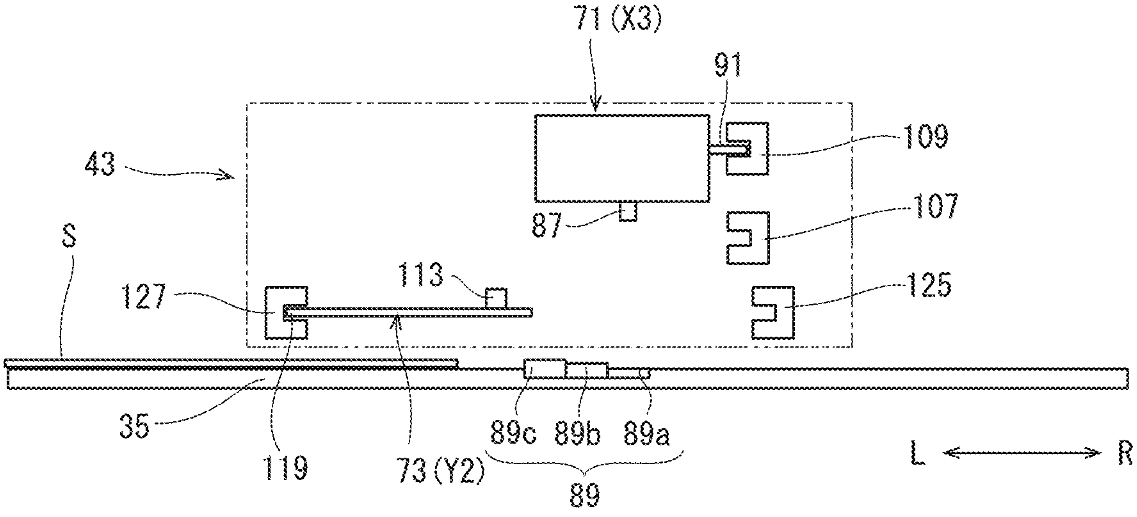
FIG. 10B is a view explaining the image inspection operation of the image reading inspection device according to the second embodiment, in the image forming system according to the embodiment of the present disclosure.
Figure 10C:
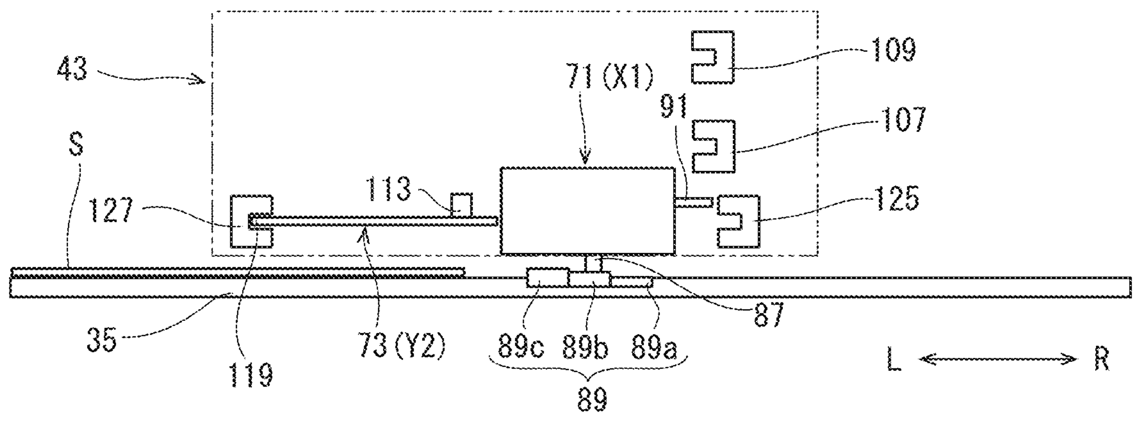
FIG. 10C is a view explaining the image inspection operation of the image reading inspection device according to the second embodiment, in the image forming system according to the embodiment of the present disclosure.

The operation of the image reading inspection device 43 according to the second embodiment in the image forming system 1 having the above configuration will be described with reference to FIG. 7 and FIG. 10A to FIG. 12C. FIG. 10A to FIG. 12C are front views schematically showing the image reading inspection device 43. In this example, the image reading inspection device 43 sequentially performs a shading correction, an image reading operation, and a cleaning operation of the CIS 81. FIG. 7 shows the shading correction, FIG. 10A to FIG. 10C show the image reading operation, and FIG. 11A to FIG. 12C show the cleaning operation. FIG. 7 and FIG. 10A to FIG. 12C schematically show the light shielding plates 119 and 121 of the cover plate 73.

First, the shading correction will be described. At the shading correction, as shown in FIG. 7, the CIS unit 71 is moved to the home position (the standby position X2). That is, since the optical path of the HP sensor 107 is blocked by the light shielding plate 91, the HP sensor 107 outputs the ON signal to the control part 201. The cover plate 73 is moved to the home position (the cover position Y1). That is, since the optical path of the HP sensor 125 is blocked by the right light shielding plate 121, the HP sensor 125 outputs the ON signal to the control part 201. In this state, the control part 201 performs the shading correction of the two CISs 81 using the shading sheet 111 of the cover plate 73. The both-side printing conveying belt 35 is stopped at a position where the reference protrusion 89*a* of the adjustment part 89 faces the positioning pin 87 of the CIS unit 71 from below. This position is the home position of the both-side printing conveying belt 35.

The image reading inspection device 43 is maintained in this state when the power is turned off, when the one-side printing is performed, and when it is in standby, other than when the image reading is performed. That is, the cover plate 73 faces the glass plate 85 of the CIS unit 71. Thus, paper powder or foreign matter generated from the sheet conveyed by the both-side printing conveying belt 35 is blocked by the cover plate 73, and is prevented from adhering to the glass plate 85.

Next, the image reading operation will be described with reference to FIG. 10A to FIG. 10C. First, the control part 201 drives the motor 105 to rotate the pinion 103 to lift the CIS unit 71 from the home position (the standby position X2). When the CIS unit 71 is lifted and the light path of the upper limit sensor 109 is blocked by the light shielding plate 91 of the CIS unit 71, the upper limit sensor 109 outputs the ON signal to the control part 201. The control part 201 stops the driving of the motor 105 after a predetermined time elapses after the ON signal is input. Thus, as shown in FIG. 10A, the CIS unit 71 is moved to the retracted position X3.

Next, the control part 201 drives the motor 135 to rotate the pinion 131 to move the cover plate 73 leftward from the home position (the cover position Y1). When the cover plate 73 is moved and the light path of the retraction sensor 127 is blocked by the left light shielding plate 119 of the cover plate 73, the retraction sensor 127 outputs the ON signal to the control part 201. When the ON signal is input, the control part 201 stops the driving the motor 135. Thus, as shown in FIG. 10B, the cover plate 73 is moved to the retracted position Y2.

The thickness of the sheet is previously input to the control part 201. Therefore, the control part 201 moves the both-side printing conveying belt 35 to a position where any of the protrusions 89*a*, 89*b*, and 89*c* of the adjustment part 89 according to the thickness of the sheet faces the positioning pins 87 of the CIS unit 71 from below. In this example, the both-side printing conveying belt 35 travels from the home position so that the second protrusion 89*b* is positioned below the positioning pins 87.

Next, the control part 201 drives the motor 105 to rotate the pinion 103 to lower the CIS unit 71 from the retracted position X3. When the CIS unit 71 is lowered and the optical path of the HP sensor 107 is blocked by the light shielding plate 91 of the CIS unit 71, the HP sensor 107 outputs the ON signal to the control part 201. The control part 201 stops the driving of the motor 105 after a predetermined time elapses after the ON signal is input. Thus, as shown in FIG. 10C, the CIS unit 71 is lowered to the reading position X1 where the positioning pins 87 abut the corresponding protrusion 89*b*.

In this state, when the sheet S is conveyed under the image reading inspection device 43, the image of the sheet S is read by the two CISs 81. The control part 201 performs the image inspection based on the read image. Details of the image inspection are omitted.

Figure 11A:
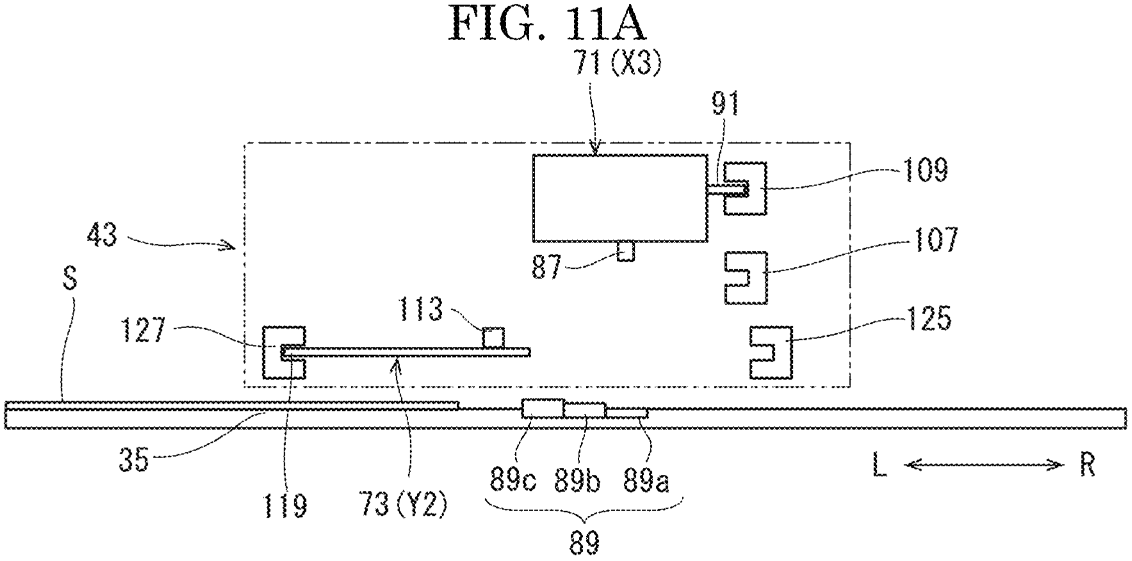
FIG. 11A is a view explaining a cleaning operation of the image reading inspection device according to the second embodiment, in the image forming system according to the embodiment of the present disclosure.

Next, the cleaning operation will be described with reference to FIG. 11A to FIG. 12C. First, the control part 201 drives the motor 105 to rotate the pinion 103 to lift the CIS unit 71 from the reading position X1. When the CIS unit 71 is lifted and the light path of the upper limit sensor 109 is blocked by the light shielding plate 91 of the CIS unit 71, the upper limit sensor 109 outputs the ON signal to the control part 201. The control part 201 stops the driving of the motor 105 after a predetermined time elapses after the ON signal is input. Thus, as shown in FIG. 11A, the CIS unit 71 is moved to the retracted position X3. The both-side printing conveying belt 35 travels to the home position.

Figure 11B:
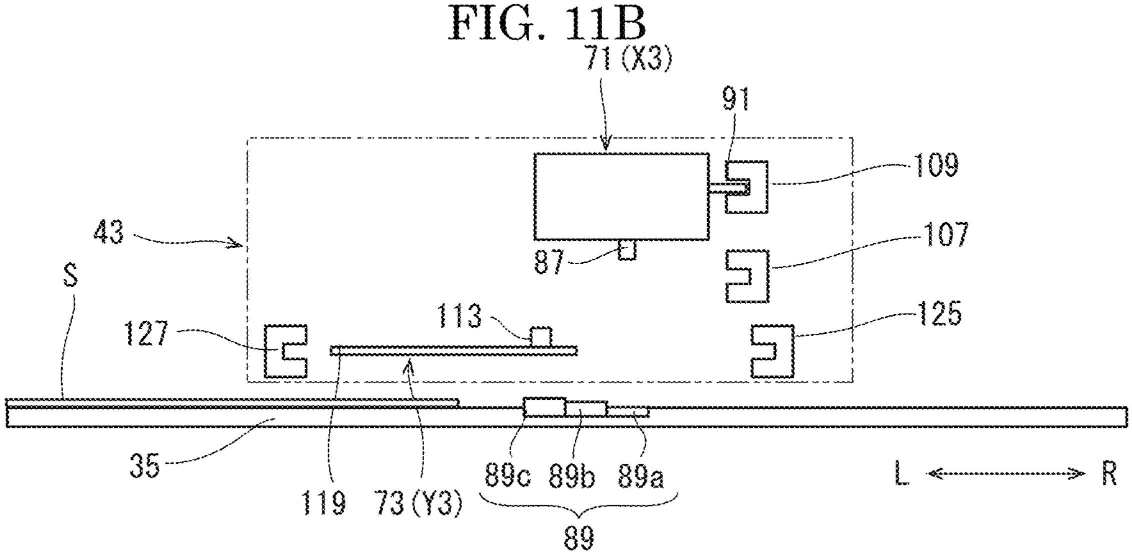
FIG. 11B is a view explaining the cleaning operation of the image reading inspection device according to the second embodiment, in the image forming system according to the embodiment of the present disclosure.

Next, the control part 201 drives the motor 135 to rotate the pinion 131 to move the cover plate 73 rightward from the retracted position Y2. When the left light shielding plate 119 is separated from the optical path of the retraction sensor 127, the retraction sensor outputs the OFF signal to the control part 201. The control part 201 stops the driving the motor 135 after a predetermined time elapses after the off signal is input. Thus, as shown in FIG. 11B, the cover plate 73 moves the cleaning member 113 to the cleaning start position Y3 where the cleaning member 113 is below the left end portion of the lower surface of the glass plate 85 of the CIS unit 71.

Figure 11C:
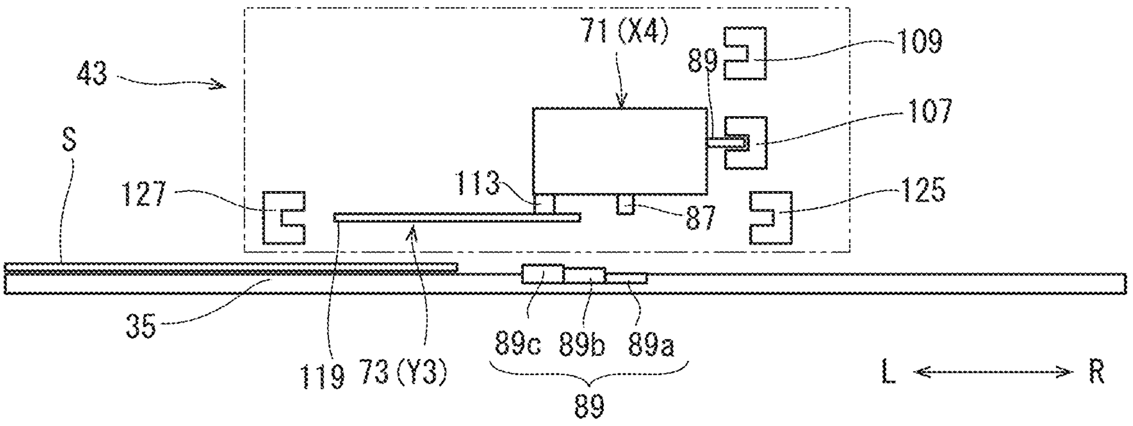
FIG. 11C is a view explaining the cleaning operation of the image reading inspection device according to the second embodiment, in the image forming system according to the embodiment of the present disclosure.

Next, the control part 201 drives the motor 105 to rotate the pinion 103 to lower the CIS unit 71 from the retracted position X3. When the CIS unit 71 is lowered and the optical path of the HP sensor 107 is blocked by the light shielding plate 91 of the CIS unit 71, the HP sensor 107 outputs the ON signal to the control part 201. The control part 201 stops the driving of the motor 105 after a predetermined time elapses after the ON signal is input. Thus, as shown in FIG. 11C, the CIS unit 71 is lowered to the cleaning position X4 where the left end portion of the lower surface of the glass plate 85 abuts against the cleaning member 113 of the cover plate 73. The cleaning member 113 is pressed against the lower surface of the glass plate 85 at a predetermined pressure.

Figure 12A:
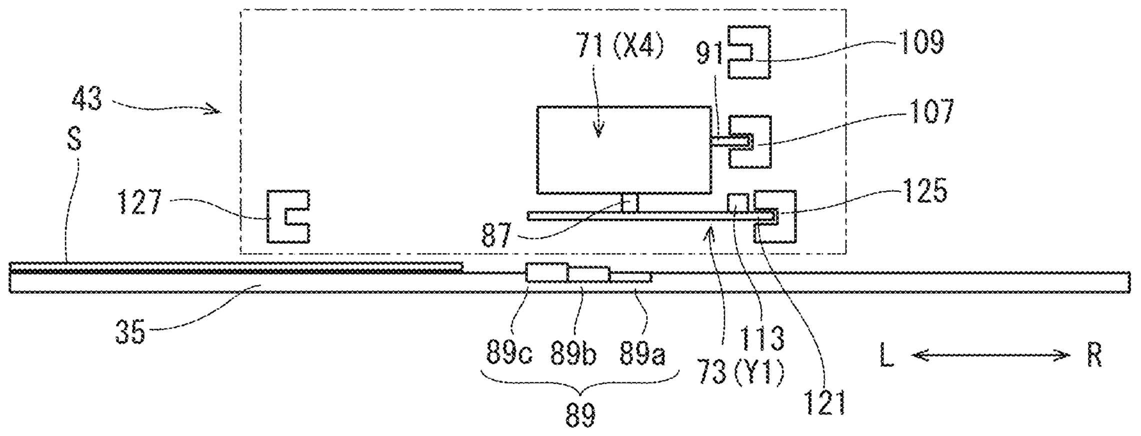
FIG. 12A is a view explaining the cleaning operation of the image reading inspection device according to the second embodiment, in the image forming system according to the embodiment of the present disclosure.

Thereafter, the control part 201 drives the motor 135 to rotate the pinion 131 to move the cover plate 73 rightward from the cleaning start position Y3. Thereby, the foreign matter adhering to the lower surface of the glass plate 85 is wiped off by the cleaning member 113. When the cover plate 73 is moved and the cleaning member 113 is separated from the CIS unit 71 rightward, the light path of the HP sensor 125 is blocked by the right light shielding plate 121, and the HP sensor 125 outputs the ON signal to the control part 201. When the ON signal is input, the control part 201 stops the driving the motor 135. Thus, as shown in FIG. 12A, the cover plate 73 is moved to the cover position Y1 (the home position).

Figure 12B:
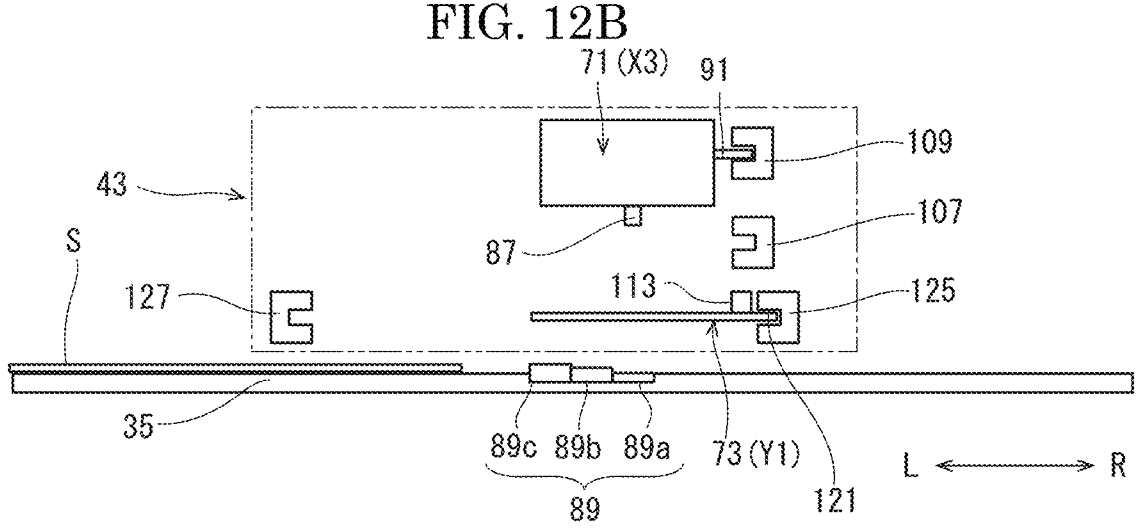
FIG. 12B is a view explaining the cleaning operation of the image reading inspection device according to the second embodiment, in the image forming system according to the embodiment of the present disclosure.

Next, the control part 201 drives the motor 105 to rotate the pinion 103 to lift the CIS unit 71 from the cleaning position X4. When the CIS unit 71 is lifted and the light path of the upper limit sensor 109 is blocked by the light shielding plate 91 of the CIS unit 71, the upper limit sensor 109 outputs the ON signal to the control part 201. The control part 201 stops the driving of the motor 105 after a predetermined time elapses after the ON signal is input. Thus, as shown in FIG. 12B, the CIS unit 71 is lifted to the retracted position X3.

Figure 12C:
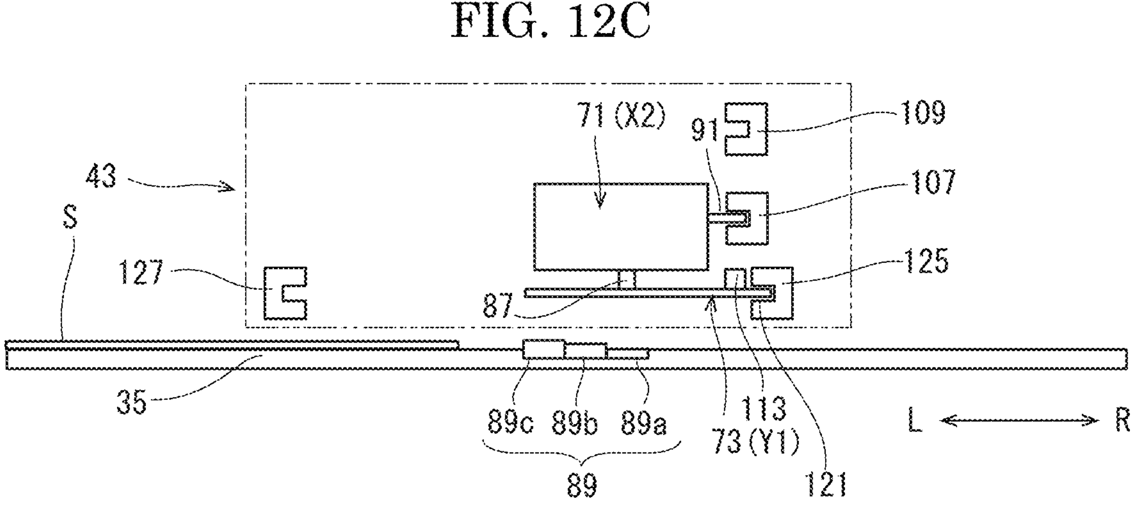
FIG. 12C is a view explaining the cleaning operation of the image reading inspection device according to the second embodiment, in the image forming system according to the embodiment of the present disclosure.

Thereafter, the control part 201 drives the motor 105 to rotate the pinion 103 to lower the CIS unit 71 from the retracted position X3. When the CIS unit 71 is lowered and the optical path of the HP sensor 107 is blocked by the light shielding plate 91, the HP sensor 107 outputs the ON signal to the control part 201. The control part 201 stops the driving of the motor 105 after a predetermined time elapses after the ON signal is input. Thus, as shown in FIG. 12C, the CIS unit 71 is lowered to the standby position X2 (the home position).

As described above, according to the present disclosure, the cover plate 73 faces the glass plate 85 of the CIS unit 71 when the power is turned off, when the one-side printing is performed, and when it is in standby. Thus, paper powder or foreign matter generated from the sheet conveyed by the both-side printing conveying belt 35 is blocked by the cover plate 73, and is prevented from adhering to the glass plate 85. Since the shading sheet is fixed on the cover plate 73, the shading correction of the CIS can be performed using the cover plate 73. Although an example in which the cover plate 73 is provided with the cleaning member 113 has been described in the present embodiment, even if the cover plate 73 is not provided with the cleaning member 113, the effect of suppressing the adhesion of foreign matter to the glass plate 85 can be obtained by the cover plate 73.

Further, the cover plate 73 is provided with the cleaning member 113, and the glass plate 85 of the CIS unit 71 is cleaned by the cleaning member 113 as the cover plate 73 is linearly moved. Therefore, paper powder or foreign matter adhering to the glass plate 85 can be removed. At this time, since the cleaning member 113 is linearly moved, the entire surface of the glass plate 85 can be uniformly cleaned.

Further, since the CIS unit 71 is moved along the upper-and-lower direction and the cover plate 73 is moved along the left-and-right direction, each of them can be arranged so that their moving spaces do not interfere.

Although the present disclosure has been described in particular embodiments, the present disclosure is not limited to the foregoing embodiments. To the extent that it does not deviate from the scope and subject matter of the present disclosure, it may be variously modified, substituted, or modified, and the claims include all embodiments that may be included within the scope of technical thought.

The invention claimed is:

1. An image forming system including an image reading device which reads an image of a sheet conveyed along a conveyance path, wherein the image reading device includes:

a reading sensor which optically reads the image; and a moving mechanism which moves the reading sensor to a reading position closer to the conveyance path and readable the image and a non-reading position separated from the conveyance path farther than the reading position in an upper-and-lower direction perpendicular to a conveying direction of the sheet along the conveyance path.

2. The image forming system according to claim 1, wherein the image reading device includes a cover plate movable to a cover position covering an image reading surface of the reading sensor moved to the non-reading position and a retracted position exposing the image reading surface of the reading sensor moved to the reading position.

3. The image forming system according to claim 2, wherein the cover member is moved in a direction parallel to the conveying direction.

4. The image forming system according to claim 2, wherein the reading sensor includes a transparent member covering the image reading surface, the cover member includes a cleaning member which can clean the transparent member, and when the reading sensor is moved to the non-reading position, as the cover member is moved from the retracted position to the cover position, the cleaning member cleans the transparent member.

5. The image forming system according to claim 1, wherein a height of the reading sensor at the reading position can be varied depending on a thickness of the sheet.

6. The image forming system according to claim 1, wherein the image reading device is disposed above a both-side printing conveyance path, and the reading sensor is moved to the non-reading position when power is turned off, when a one-side printing is performed, and when it is in standby.

7. An image forming system including an image reading device which reads an image of a sheet conveyed along a conveyance path, wherein the image reading device includes:

a reading sensor which optically reads the image;

a moving mechanism which moves the reading sensor to a reading position closer to the conveyance path and readable the image and a non-reading position separated from the conveyance path farther than the reading position; and a cover plate movable to a cover position covering an image reading surface of the reading sensor moved to the non-reading position and a retracted position exposing the image reading surface of the reading sensor moved to the reading position, the cover member includes an adjustment reference white plate used for shading correction, and when the reading sensor is moved to the non-reading position, the shading correction for the reading sensor can be performed using the adjustment reference white plate.

* * * * *